US011831410B2

(12) United States Patent
Chen

(10) Patent No.: US 11,831,410 B2
(45) Date of Patent: *Nov. 28, 2023

(54) INTELLIGENT SERVERLESS FUNCTION SCALING

(71) Applicant: RED HAT, INC., Raleigh, NC (US)

(72) Inventor: Huamin Chen, Westford, MA (US)

(73) Assignee: Red Hat, Inc., Raleigh, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 17/505,915

(22) Filed: Oct. 20, 2021

(65) Prior Publication Data
US 2022/0038355 A1 Feb. 3, 2022

Related U.S. Application Data

(63) Continuation of application No. 16/877,642, filed on May 19, 2020, now Pat. No. 11,184,263.

(51) Int. Cl.
H04L 12/26 (2006.01)
G06F 9/54 (2006.01)
H04L 43/0817 (2022.01)
H04L 43/0852 (2022.01)
H04L 43/16 (2022.01)
H04L 41/5003 (2022.01)
H04L 47/762 (2022.01)
G06F 9/455 (2018.01)

(52) U.S. Cl.
CPC ...... H04L 43/0817 (2013.01); G06F 9/45558 (2013.01); G06F 9/542 (2013.01); H04L 41/5003 (2013.01); H04L 43/0852 (2013.01); H04L 43/16 (2013.01); H04L 47/762 (2013.01); G06F 2009/45595 (2013.01)

(58) Field of Classification Search
CPC ............. H04L 43/0817; H04L 41/5003; H04L 43/0852; H04L 43/16; H04L 47/762; H04L 41/40; H04L 41/5054; H04L 43/20; G06F 9/45558; G06F 9/542; G06F 2009/45595; G06F 2209/501; G06F 9/4484; G06F 9/5027; G06F 9/45533
See application file for complete search history.

(56) References Cited

U.S. PATENT DOCUMENTS 11,018,965 B1* 5/2021 Ibryam ................. H04L 67/101
2019/0179678 A1* 6/2019 Banerjee ............... G06F 9/5083
2019/0230154 A1* 7/2019 Doshi ................. H04L 41/5051
(Continued)

OTHER PUBLICATIONS

Beswick, J. (Dec. 4, 2019). "New for AWS Lambda—Predictable start-up times with Provisioned Concurrency" AWS Compute Blog, 12 pages.
(Continued)

Primary Examiner — Abdullahi E Salad
(74) Attorney, Agent, or Firm — Womble Bond Dickinson (US) LLP

(57) ABSTRACT

A system and method of serverless function scaling is described. The method may include receiving one or more types of serverless function invocations. The method also includes invoking one or more serverless functions and receiving metrics from the one or more serverless functions. The method also includes generating scaling heuristics for scaling of a number of serverless functions in view of the received metrics.

19 Claims, 8 Drawing Sheets

(56) References Cited

U.S. PATENT DOCUMENTS

| | | | |
|---|---|---|---|
| 2019/0312899 A1* | 10/2019 | Shulman | H04L 63/029 |
| 2019/0377604 A1* | 12/2019 | Cybulski | G06F 9/5072 |
| 2020/0081745 A1* | 3/2020 | Cybulski | G06F 9/545 |
| 2020/0151032 A1* | 5/2020 | Zhang | G06F 9/4881 |
| 2020/0195520 A1* | 6/2020 | Guim Bernat | G06F 30/34 |
| 2020/0241999 A1* | 7/2020 | Guim Bernat | G06F 11/3495 |
| 2020/0267155 A1* | 8/2020 | Segal | G06N 20/00 |
| 2020/0310850 A1* | 10/2020 | Liguori | G06F 11/1438 |
| 2021/0026692 A1* | 1/2021 | Mestery | H04L 61/4511 |
| 2021/0064416 A1* | 3/2021 | San Miguel | G06F 9/48 |

OTHER PUBLICATIONS

Cybulski, Y. (Dec. 4, 2019). "Introducing: Adaptive Scaling and Function Chaining Auto-Scaling" NUWEBA, 9 pages.

Mooney, M. (Feb. 5, 2020). "Key metrics for monitoring AWS Lambda" Datadog's Research Report: The State of Serverless, 16 pages.

* cited by examiner

INTELLIGENT SERVERLESS FUNCTION SCALING

CROSS REFERENCE TO RELATED APPLICATIONS

This application is a continuation of U.S. patent application Ser. No. 16/877,642, filed May 19, 2020, the contents of which are incorporated by reference herein.

TECHNICAL FIELD

Aspects of the present disclosure relate to a serverless function system, and more particularly, to intelligently scaling serverless functions.

BACKGROUND

A serverless function system may be executed by a cloud computing system. The cloud computing system may dynamically manage the allocation and provisioning of serverless functions on servers of the cloud computing system. The serverless functions may be execution environments for the performance of various functions.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
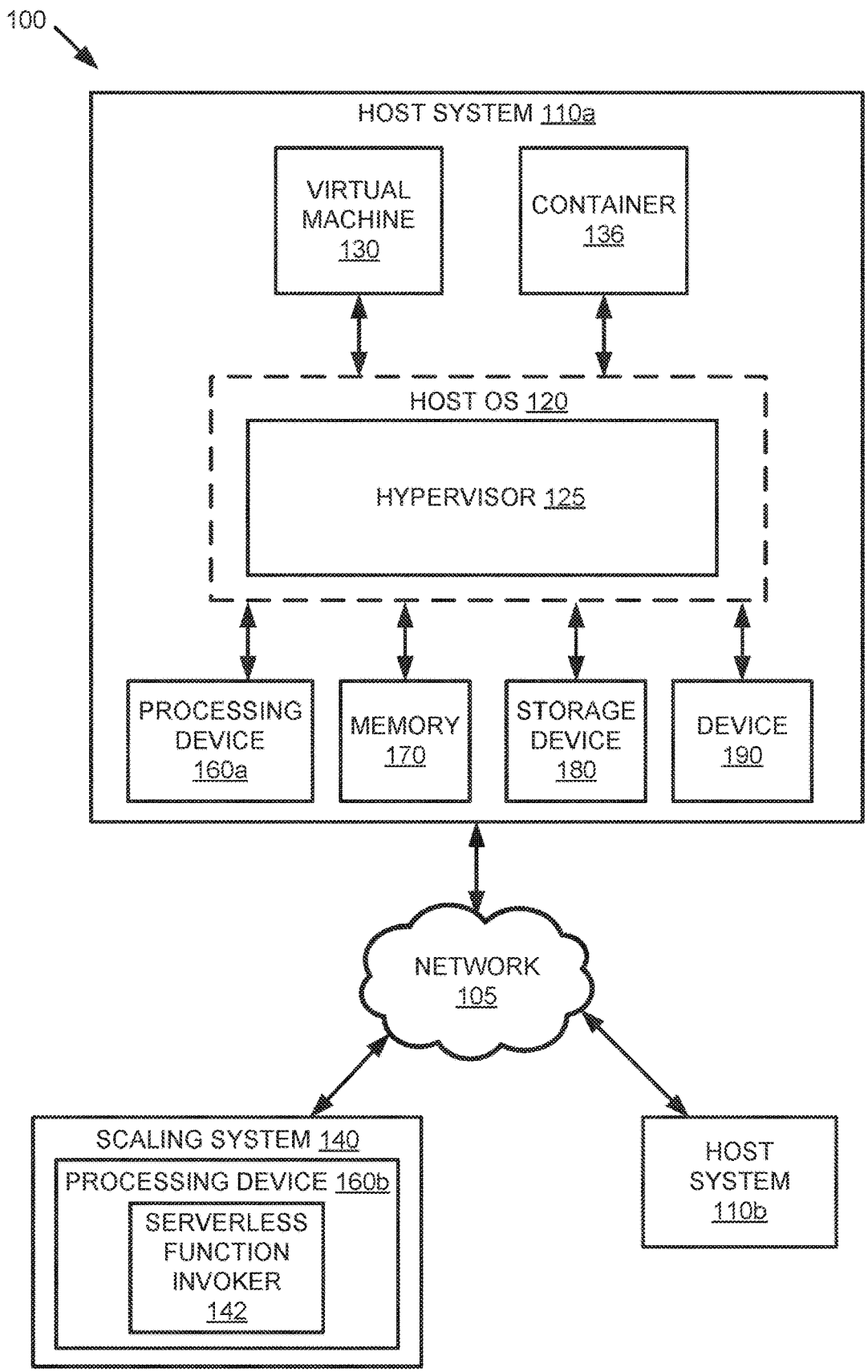
FIG. 1 is a block diagram that illustrates an example computer architecture, in accordance with some embodiments.

In embodiments, a cloud computing system may provide a serverless framework for the performance of client functions/operations (also referred to as "functions" hereafter). For example, the serverless framework may execute functions of a client web application. The serverless framework may invoke one or more serverless functions to execute the functions for the client. In embodiments, the serverless functions may be execution environments for the execution of the functions. For example, the serverless functions may be virtual machines (VMs) and/or containers.

A conventional serverless framework may scale the number of serverless functions available for use based on a number of requests received by the conventional serverless framework to reduce serverless function deployment latency (also referred to as "cold start latency" hereafter) and to manage computing overhead being dedicated to the serverless functions. For example, if there are no requests for functions to be executed by the serverless framework, existing serverless functions may be removed/shut down to conserve computing overhead. In another example, if there are large number of requests, the conventional serverless framework may invoke a large number of serverless functions and/or extend the lifecycle of existing serverless functions (e.g., increase the amount of time before serverless functions are shut down) for execution of the various functions associated with the requests.

Using a simplistic request driven scaling method, however, may result in an inefficient use of computing resources of the cloud computing system. For example, such a method may result in the extension of the lifecycle of a serverless function that should have been shut down earlier. In another example, such a method may introduce cold start latency when new serverless functions must be invoked due to a lack of existing serverless functions to execute the different functions associated with the requests.

Aspects of the disclosure address the above-noted and other deficiencies by intelligently scaling the number of serverless functions based on identifying different types of serverless function invocations being received by the serverless framework. Processing logic of a processing device executing the serverless framework may receive the serverless function invocations and determine quantities of the different types of serverless function invocations being received. In embodiments, a type of serverless function invocation may correspond to a request to perform a function. For example, the serverless function invocation may correspond to a request received by the serverless framework to perform a function of a web application. In an embodiment, a type of serverless function invocation may correspond to a scaling command that causes the serverless framework to invoke/remove serverless functions.

The processing logic may use the quantities of the types of service function invocations to determine a rate for scaling the number of serverless functions. In embodiments, if there are a large number of serverless function invocations associated with requests to execute functions and a large number of serverless function invocations associated with scaling commands, then the processing logic may scale up the number of serverless functions at a higher rate to reduce cold start latency for executing the functions associated with the requests. In an embodiment, if there are a low number of serverless function invocations associated with requests to execute functions and a large number of serverless function invocations associated with scaling commands, then the processing logic may scale up the number of serverless functions at a lower rate to conserve computing overhead.

In embodiments, the processing logic may receive and analyze metrics associated with the serverless functions to improve the performance of the serverless framework. In embodiments, the metrics may correspond to latencies of the serverless functions, runtimes of functions executed by the serverless functions, idle times of the serverless functions, and/or any other metric associated with the serverless functions. The metrics may be used to generate scaling heuristics, which may be used by the processing logic to determine the rate for scaling the number of serverless functions.

Having the processing logic identify quantities of types of serverless function invocations results in an improved serverless function system. By determining quantities of different types of serverless function invocations, the rate of scaling the number of serverless functions can be optimized to reduce latencies of executing various functions, while avoiding excessive consumption of computing overhead by deploying too many serverless functions or overextending lifecycles of existing serverless functions.

FIG. 1 depicts a high-level component diagram of an illustrative example of a computer system architecture 100, in accordance with one or more aspects of the present disclosure. One skilled in the art will appreciate that other computer system architectures 100 are possible, and that the implementation of a computer system utilizing examples of the invention are not necessarily limited to the specific architecture depicted by FIG. 1.

As shown in FIG. 1, computer system architecture 100 includes host systems 110a, b and scaling system 140. The host systems 110a, b and scaling system 140 include one or more processing devices 160a, b, memory 170, which may include volatile memory devices (e.g., random access memory (RAM)), non-volatile memory devices (e.g., flash memory) and/or other types of memory devices, a storage device 180 (e.g., one or more magnetic hard disk drives, a Peripheral Component Interconnect [PCI] solid state drive, a Redundant Array of Independent Disks [RAID] system, a network attached storage [NAS] array, etc.), and one or more devices 190 (e.g., a Peripheral Component Interconnect [PCI] device, network interface controller (NIC), a video card, an I/O device, etc.). In certain implementations, memory 170 may be non-uniform access (NUMA), such that memory access time depends on the memory location relative to processing device 160a, b. It should be noted that although, for simplicity, a single processing device 160a, b, storage device 180, and device 190 are depicted in FIG. 1, other embodiments of host systems 110a, b and scaling system 140 may include a plurality of processing devices, storage devices, and devices. The host systems 110a, b and scaling system 140 may be a server, a mainframe, a workstation, a personal computer (PC), a mobile phone, a palm-sized computing device, etc. In embodiments, host systems 110a, b and scaling system 140 may be separate computing devices. In some embodiments, host systems 110a, b and/or scaling system 140 may be implemented by a single computing device. For clarity, some components of scaling system 140 and host system 110b are not shown. Furthermore, although computer system architecture 100 is illustrated as having two host systems, embodiments of the disclosure may utilize any number of host systems.

Host system 110a, b may additionally include one or more virtual machines (VMs) 130, containers 136, and host operating system (OS) 120. VM 130 is a software implementation of a machine that executes programs as though it was an actual physical machine. Container 136 acts as isolated execution environments for different functions of applications, as previously described. The VM 130 and/or container 136 may be a serverless function for executing one or more functions of a serverless framework, as previously described. Host OS 120 manages the hardware resources of the computer system and provides functions such as inter-process communication, scheduling, memory management, and so forth.

Host OS 120 may include a hypervisor 125 (which may also be known as a virtual machine monitor (VMM)), which provides a virtual operating platform for VMs 130 and manages their execution. Hypervisor 125 may manage system resources, including access to physical processing devices (e.g., processors, CPUs, etc.), physical memory (e.g., RAM), storage device (e.g., HDDs, SSDs), and/or other devices (e.g., sound cards, video cards, etc.). The hypervisor 125, though typically implemented in software, may emulate and export a bare machine interface to higher level software in the form of virtual processors and guest memory. Higher level software may comprise a standard or real-time OS, may be a highly stripped down operating environment with limited operating system functionality, and/or may not include traditional OS facilities, etc. Hypervisor 125 may present other software (i.e., "guest" software) the abstraction of one or more VMs that provide the same or different abstractions to various guest software (e.g., guest operating system, guest applications). It should be noted that in some alternative implementations, hypervisor 125 may be external to host OS 120, rather than embedded within host OS 120, or may replace host OS 120.

The host systems 110a, b, and scaling system 140 are coupled to each other (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a WiFi™ hotspot connected with the network 105 and/or a wireless carrier system that can be implemented using various data processing equipment, communication towers (e.g., cell towers), etc. The network 105 may carry communications (e.g., data, message, packets, frames, etc.) between the various components of host systems 110a, b and/or scaling system 140.

In embodiments, processing device 160b may execute a serverless function invoker 142. The serverless function invoker 142 may control the scaling of serverless functions at a determined rate. For example, the serverless function invoker 142 may invoke or remove serverless functions, such as VMs or containers, for executing application functions. The serverless function invoker 142 may determine the rate for scaling the serverless functions based on quantities of one or more types of serverless function invocations. The serverless function invoker 142 may further determine the rate for scaling the serverless functions based on one or more scaling heuristics. Further details regarding serverless function invoker 142 will be discussed at FIGS. 2-7 below.

Figure 2:
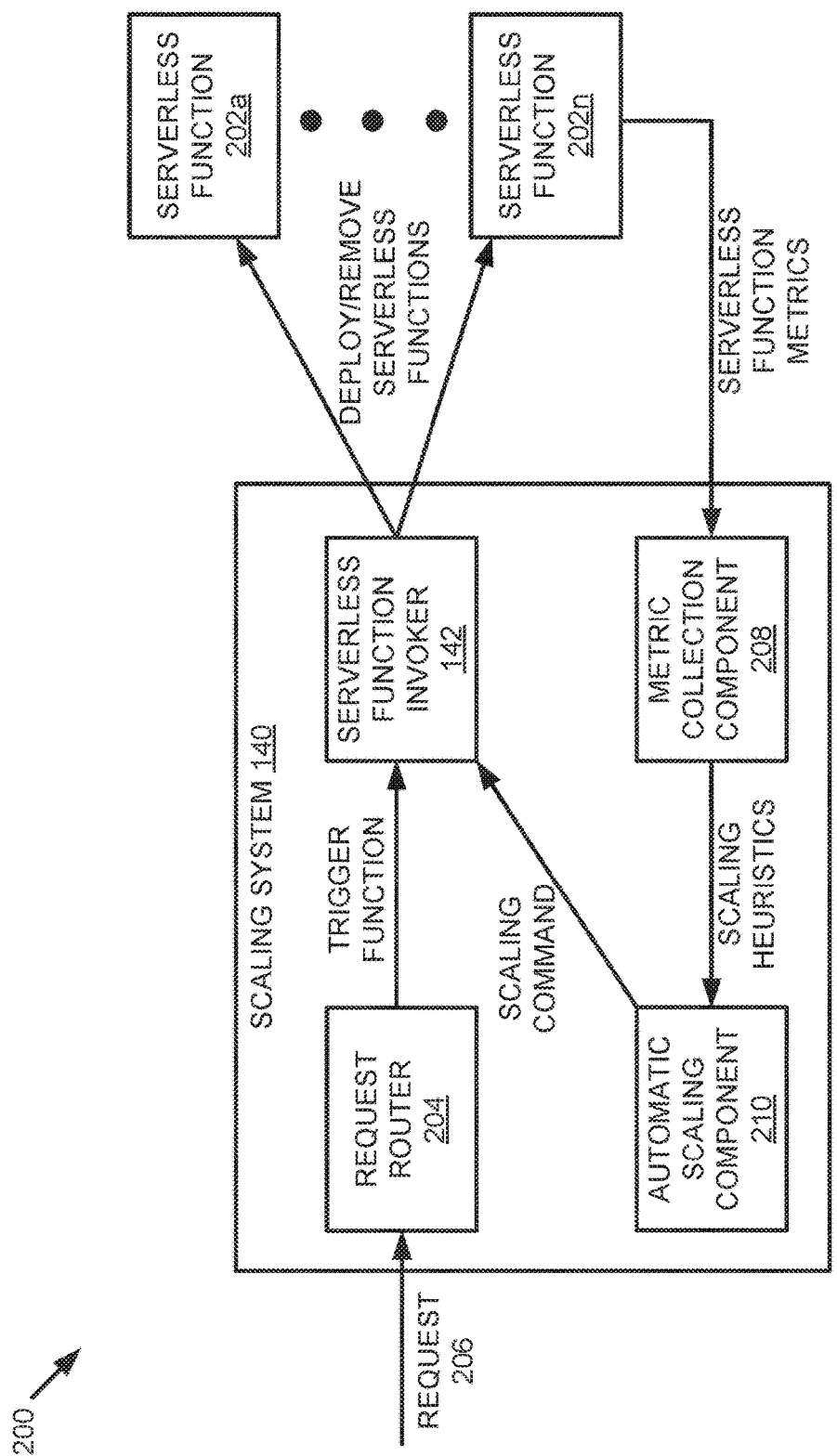
FIG. 2 is an illustration of an example of a scaling system intelligently scaling a number of serverless functions, in accordance with embodiments of the disclosure.

FIG. 2 is an illustration 200 of an example of a scaling system intelligently scaling a number of serverless functions, in accordance with embodiments of the disclosure. In illustration 200, scaling system 140 may control the scaling of serverless functions 202a-n on host systems (not shown). Serverless functions 202a-n may correspond to any number of serverless functions on the host systems. In embodiments, serverless functions 202a-n may be any combination of VMs and/or containers (e.g., VM 130 and/or container 136 of FIG. 1).

The scaling system 140 includes a processing logic of a processing device (not shown) that may execute a serverless function invoker 142, a request router 204, a metric collection component 208 and/or an automatic scaling component 210. The request router 204 may receive a request 206 for the serverless framework to perform a function. For example, the request router 204 may receive a request for the serverless framework to perform a function of a web application. Upon receiving the request 206, the request router 204 may provide a trigger function to the serverless function invoker 142. The trigger function may be a type of serverless function invocation that causes the serverless function invoker 142 to invoke a serverless function to execute the function associated with request 206 or provide an existing serverless function to execute the function associated with the request 206. In embodiments, the request router 204 may maintain a routing data structure, such as a routing table, that maps requests to corresponding serverless functions 202a-n that are to execute the functions associated with the requests.

The metric collection component 208 may receive serverless function metrics from the serverless functions 202a-n. In some embodiments, the serverless function metrics may include latencies associated with serverless functions 202a-n. For example, the serverless metric functions may include cold-start latencies (e.g., how long it takes for a serverless function to be invoked and begin executing a function), a total latency (e.g., total time it takes for a serverless function to execute a requested function), or any other type of latency. In embodiments, the serverless function metrics may include idle times associated with the serverless functions 202a-n. An idle time may correspond to an amount of time that a serverless function exists while not executing a function. In some embodiments, the serverless function metrics may be information, such as run times, associated with the functions that are executed by serverless functions 202a-n. In an embodiment, the serverless function metrics may be any other type of metric associated with serverless functions 202a-n.

In embodiments, the serverless function metrics may correspond to different types of serverless function invocations. For example, for a serverless function invocation based on a request (e.g., request 206) received by scaling system 140, the serverless function metrics may correspond to the cost of starting up a serverless function and waiting for the code to execute the function associated with the request to start. In another example, for a serverless function invocation based on a scaling command, the serverless function metrics may correspond to the cost of starting up a serverless function, waiting for the code to execute a function, and the amount of time taken for the request router 204 to update a routing data structure to include the new serverless function.

The metric collection component 208 may generate scaling heuristics based on the serverless function metrics received from serverless functions 202a-n, which are provided to an automatic scaling component 210. The scaling heuristics may be used to determine different rates for the scaling of the number of serverless functions 202a-n based on the serverless function metrics received by the metric collection component 208. For example, the scaling heuristics may be used to determine rates for scaling the number of serverless functions 202a-n based on a number of requests (e.g., request 206) received by the scaling system 140, the types of requests received by the scaling system 140, a number of different types of serverless function invocations received by the scaling system 140, or any combination thereof.

Upon receiving the scaling heuristics, the automatic scaling component 210 may transmit one or more scaling commands to the serverless function invoker 142 based on the scaling heuristics. The scaling command may correspond to a type of service function invocation. In embodiments, the automatic scaling component 210 may generate the scaling command upon the scaling heuristics indicating that more serverless functions 202a-n are needed to execute functions associated with requests received by 206. For example, the scaling heuristics may indicate that latencies for processing requests have exceeded a threshold value and more serverless functions 202a-n are needed to execute the functions associated with the requests in a timely manner. In an embodiment, the automatic scaling component 210 may generate the scaling command upon the scaling heuristics indicating that one or more serverless functions 202a-n are to be removed/shut down to conserve computing overhead. For example, the scaling heuristics may indicate that idle times of one or more of the serverless functions 202a-n have exceeded a threshold.

The serverless function invoker 142 may scale the number of serverless functions 202a-n by deploying/invoking new serverless functions and/or removing/shutting down existing serverless functions. In embodiments, the serverless function invoker 142 may scale the number of serverless functions based on quantities of different serverless function invocations received by the serverless function invoker 142. For example, the serverless function invoker 142 may scale the number of serverless functions 202a-n based on the quantity of trigger functions (e.g., a type of serverless function invocation) and/or the quantity of scaling commands (e.g., another type of serverless function invocation). In embodiments, the serverless function invoker 142 may scale the number of serverless functions 202a-n at determined rate(s) based on the quantities of one or more types of serverless function invocations. For example, the serverless function invoker 142 may deploy a number of serverless functions at a determined rate and/or remove a number of serverless functions at a determined rate based on the quantity of one or more types of serverless function invocations.

Figure 3:
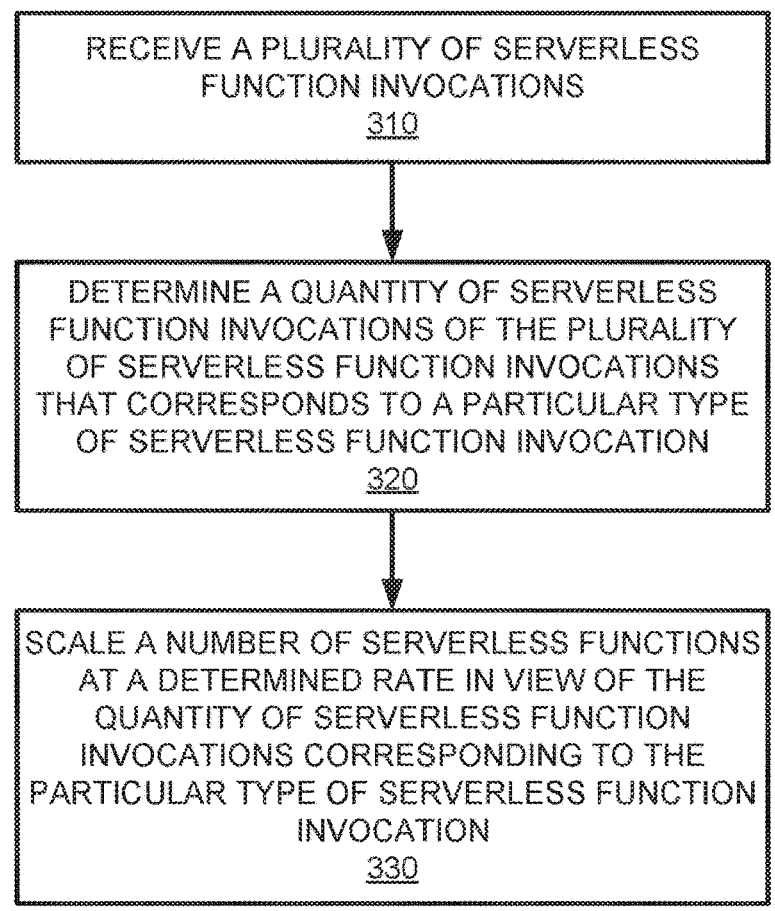
FIG. 3 is a flow diagram of a method of intelligently scaling a number of serverless functions, in accordance with some embodiments.

FIG. 3 is a flow diagram of a method 300 of intelligently scaling a number of serverless functions, in accordance with some embodiments. Method 300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 300 may be performed by serverless function invoker 142 of scaling system 140 of FIG. 1.

With reference to FIG. 3, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

Method 300 begins at block 310, where the processing logic receives a plurality of serverless function invocations. The plurality of serverless function invocations may include different types of serverless function invocations. In some embodiments, a type of the plurality of serverless function invocations may correspond to a trigger function received from a request router (e.g., request router 204 of FIG. 2). In embodiments, a type of the plurality of serverless function invocations may correspond to a scaling command received from an automatic scaling component (e.g., automatic scaling component 210 of FIG. 2). In an embodiment, a type of the plurality of serverless function invocations may correspond to any command that causes the processing logic to scale a number of serverless functions.

At block 320, the processing logic determines a quantity of serverless function invocations of the plurality of serverless function invocations that corresponds to a particular type of serverless function invocation. In embodiments, the processing logic may determine a quantity of serverless function invocations that correspond to trigger functions received from a request router. In an embodiment, the processing logic may determine a quantity of serverless function invocations that correspond to scaling commands received from an automatic scaling component. In some embodiments, the processing logic may determine a quantity of another type of serverless function invocation. In embodiments, the processing logic may determine quantities of multiple types of serverless function invocations. For example, the processing logic may determine a first quantity of serverless function invocations that correspond to trigger functions and a second quantity of serverless function invocations that correspond to scaling commands.

At block 330, the processing logic scales a number of serverless functions at a determined rate in view of the quantity of serverless function invocations corresponding to the particular type of serverless function invocation. In embodiments, the determined rate may correspond to a rate for invoking/deploying a number of serverless functions. In an embodiment, the determined rate may correspond to a rate for removing/shutting down a number of serverless functions. In some embodiments, the processing logic may invoke a number of serverless functions at a first rate, then subsequently remove a number of serverless functions at a second rate.

In embodiments, the rate for scaling the number of serverless functions may be determined using multiple quantities of different types of serverless function invocations. For example, if the quantity of serverless function invocations corresponding to trigger functions and the quantity of serverless function invocations corresponding to scaling commands are both high (e.g., are greater than a threshold), then the processing logic may scale the number of serverless functions at a higher rate. However, if the quantity of serverless function invocations corresponding to trigger functions is low (e.g., is less than a threshold), but the quantity of serverless function invocations corresponding to scaling commands is high (e.g., is greater than a threshold), then the processing logic may scale the number of serverless functions at a lower rate.

In some embodiments, the rate for scaling the number of serverless functions may be a linear rate. In embodiments, the rate for scaling the number of serverless functions may be an exponential rate. In an embodiment, the rate for scaling the number of serverless functions may be a step function. In embodiments, other types of models may be used for determining the rate for scaling the number of serverless functions.

Figure 4:
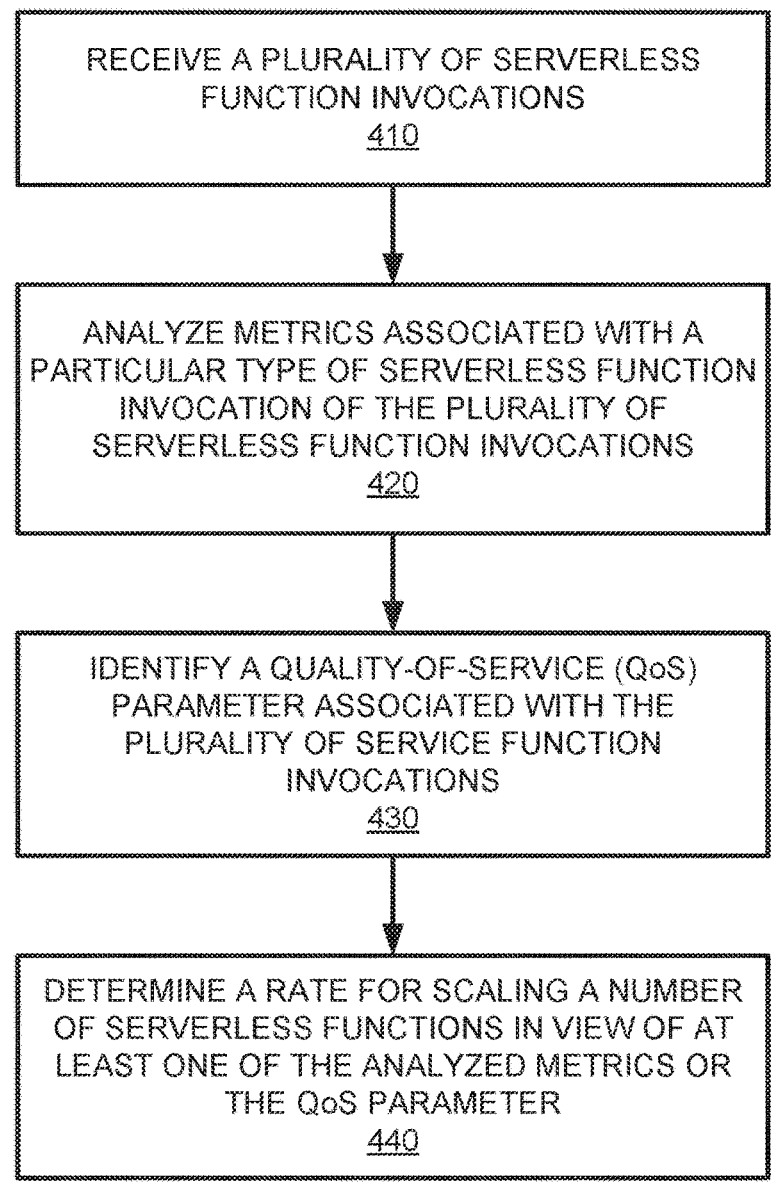
FIG. 4 is a flow diagram of a method of determining a rate for scaling a number of serverless functions, in accordance with some embodiments.

FIG. 4 is a flow diagram of a method 400 of determining a rate for scaling a number of serverless functions, in accordance with some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed by serverless function invoker 142 of scaling system 140 of FIG. 1.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Method 400 begins at block 410, where the processing logic receives a plurality of serverless function invocations. In embodiments, the plurality of serverless function invocations may include different types of serverless function invocations, as previously described.

At block 420, the processing logic analyzes metrics associated with a particular type of serverless function invocation of the plurality or serverless function invocations. In embodiments, the processing logic may analyze serverless function metrics for one or more types of serverless function invocations, as previously described at FIG. 2. For example, for a serverless function invocation corresponding to a trigger function, the processing logic may analyze metrics associated the cost of starting up a serverless function and/or waiting for the code to execute the function associated with the request to start. In another example, for a serverless function invocation corresponding to a scaling command, the processing logic may analyze metrics associated with the cost of starting up a serverless function, waiting for code to execute a function, and/or the amount of time taken for a request router to update a routing data structure to include the new serverless function.

At block 430, the processing logic identifies a quality-of-service (QoS) parameter associated with the plurality of service function invocations. In some embodiments, a QoS parameter may be assigned to particular service function invocations. The QoS parameter may include one or more performance requirements for the particular service function invocations. For example, a QoS parameter may indicate a maximum latency for service function invocations received from a particular client. In embodiments, multiple QoS parameters may be used for different sets and/or types of service function invocations.

At block 440, the processing logic determines a rate for scaling a number of serverless functions in view of at least one of the analyzed metrics or the QoS parameter. In embodiments, the rate may be determined in view of latencies included in the analyzed metrics. For example, the rate may be determined based on an average latency for executing a particular type of serverless function invocation. In embodiments, the rate may be determined in view of idle times included in the analyzed metrics. For example, the rate may be determined in view of how many serverless functions are idle and/or how long the serverless functions have been idle. In embodiments, the rate may be determined using other analyzed metrics associated with the serverless functions.

In embodiments, the rate may be determined in view of one or more performance requirements of the QoS parameter. For example, if the QoS parameter indicates a high performance requirement, then the rate for invoking new serverless functions and/or an amount of time existing serverless functions are kept idle before being removed may be higher than a QoS parameter indicating a lower performance requirement.

Figure 5:
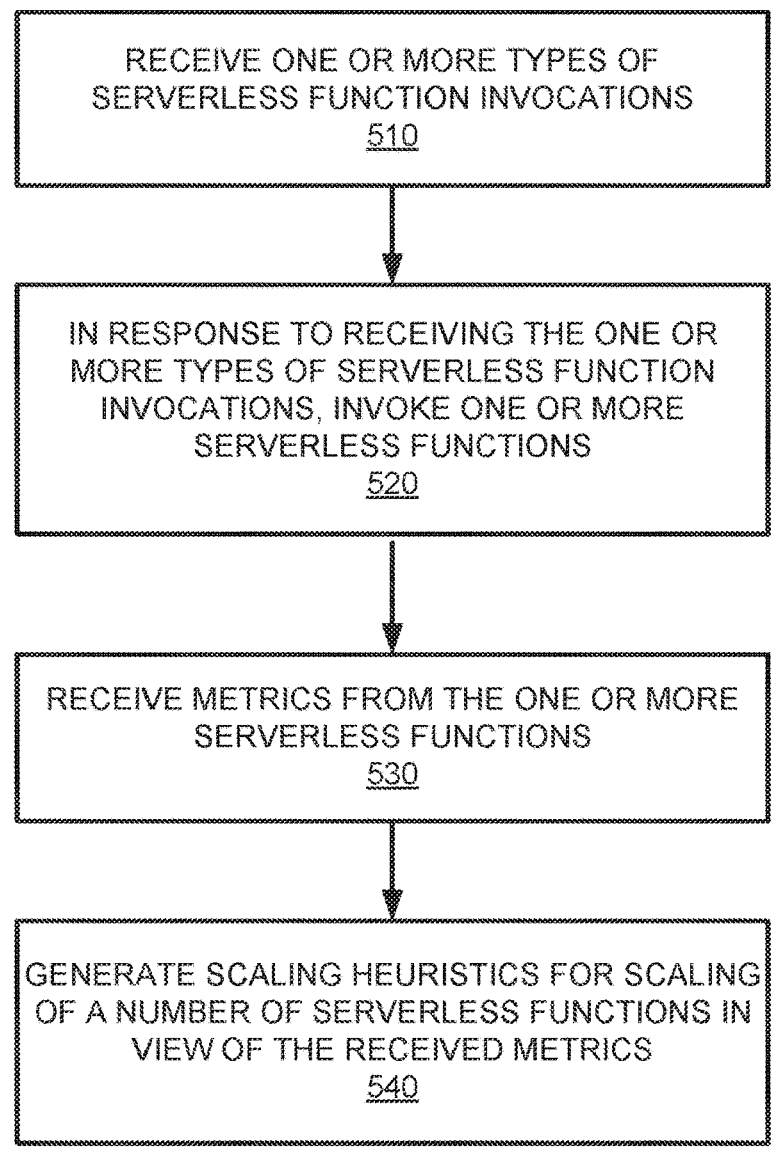
FIG. 5 is a flow diagram of a method of generating scaling heuristics for scaling serverless functions, in accordance with some embodiments.

FIG. 5 is a flow diagram of a method 500 of generating scaling heuristics for scaling serverless functions, in accordance with some embodiments. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 500 may be performed by serverless function invoker 142 of scaling system 140 of FIG. 1.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

Method 500 begins at block 510, where the processing logic receives one or more types of serverless function invocations. In embodiments, the one or more types of serverless function invocations may include trigger functions and/or scaling commands, as previously described.

At block 520, in response to receiving the one or more types of serverless function invocations, the processing logic invokes one or more serverless functions.

At block 530, the processing logic receives metrics from the one or more serverless functions. In embodiments, the metrics may be associated with the one or more types of serverless function invocations. For example, a first set of the metrics may be associated with trigger functions received at block 510 and a second set of the metrics may be associated with scaling commands received at block 510.

At block 540, the processing logic generates scaling heuristics for scaling a number of serverless functions in view of the received metrics. In embodiments, the scaling heuristics may be used to determine a rate for scaling the number of serverless functions. For example, the scaling heuristics may be used to determine a rate for invoking new serverless functions and/or a rate for removing existing serverless functions. In some embodiments, the scaling heuristics may be used to determine rates for scaling based on quantities of different types of serverless function invocations, as previously described.

Figure 6:
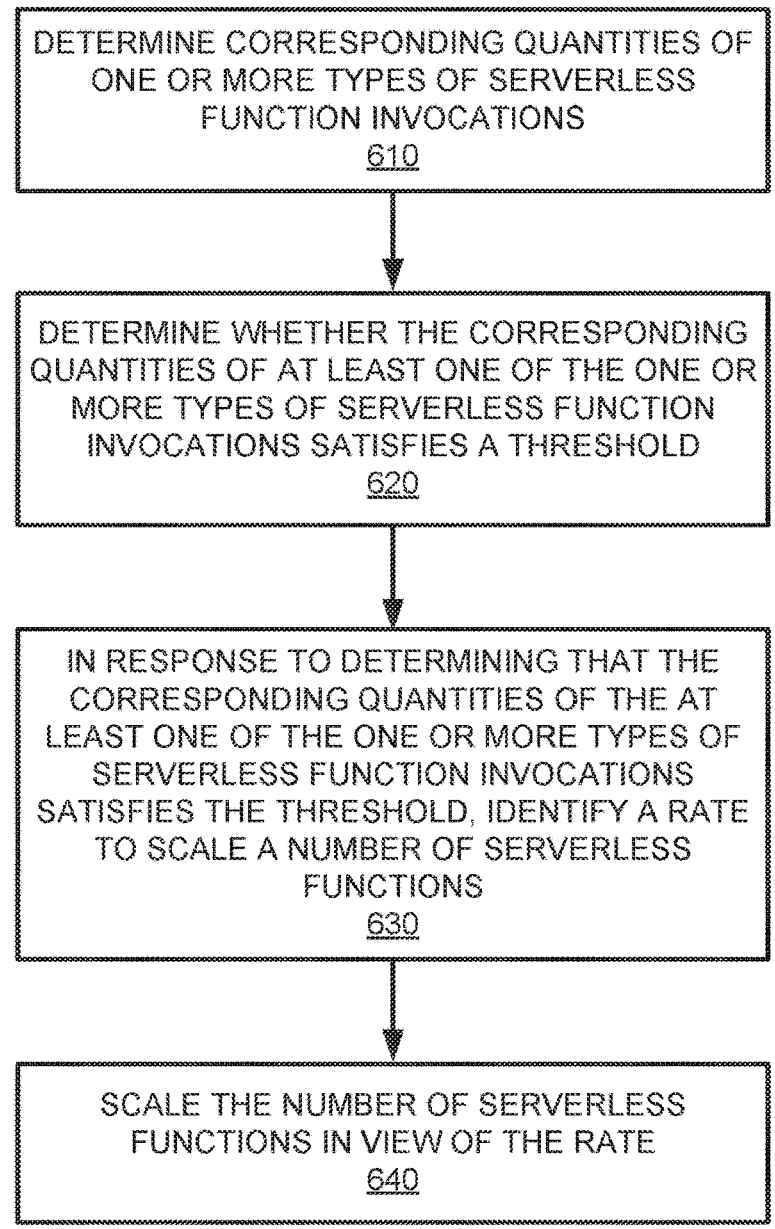
FIG. 6 is a flow diagram of a method of utilizing a threshold to identify a rate of scaling serverless functions, in accordance with some embodiments.

FIG. 6 is a flow diagram of a method 600 of utilizing a threshold to identify a rate of scaling serverless functions, in accordance with some embodiments. Method 600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 600 may be performed by serverless function invoker 142 of scaling system 140 of FIG. 1.

With reference to FIG. 6, method 600 illustrates example functions used by various embodiments. Although specific function blocks ("blocks") are disclosed in method 600, such blocks are examples. That is, embodiments are well suited to performing various other blocks or variations of the blocks recited in method 600. It is appreciated that the blocks in method 600 may be performed in an order different than presented, and that not all of the blocks in method 600 may be performed.

Method 600 begins at block 610, where the processing logic determines corresponding quantities of one or more types of serverless function invocations. For example, the processing logic may determine corresponding quantities of received trigger functions and/or scaling commands.

At block 620, the processing logic determines whether the corresponding quantities of at least one of the one or more types of serverless function invocations satisfies a threshold. In an embodiment, the threshold may be satisfied if the quantity of a type of serverless function invocations is greater than or equal to the threshold. In embodiments, the threshold may be satisfied if the quantity of the type serverless function invocations is less than or equal to the threshold.

At block 630, in response to determining that the corresponding quantities of the at least one of the one or more types of serverless function invocations satisfies the threshold, the processing logic identifies a rate to scale a number of serverless functions. For example, if the quantity of received trigger functions satisfies the threshold, then the processing logic may identify a rate to scale a number of serverless functions.

In some embodiments, the processing logic may determine a first rate for scaling the number of serverless functions based on the one or more quantities of types of serverless function invocations satisfying the threshold, and a second rate for scaling the number of serverless functions based on the one or more quantities of types of serverless function invocations not satisfying the threshold. For example, if the quantity of serverless function invocations corresponding to trigger functions is greater than the threshold, indicating that a large number of requests have been received, then the processing logic may determine to scale the number of serverless functions at a higher rate (e.g, the first rate). However, if the quantity of serverless function invocations corresponding to trigger functions is less than the threshold, indicating that a lower number of requests have been received, then the processing logic may determine to scale the number of serverless functions at a lower rate (e.g., the second rate).

At block 640, the processing logic scales the number of serverless functions in view of the rate. In embodiments, the processing logic may scale the number of serverless functions by invoking new serverless functions and/or removing existing serverless functions, as previously described.

Figure 7:
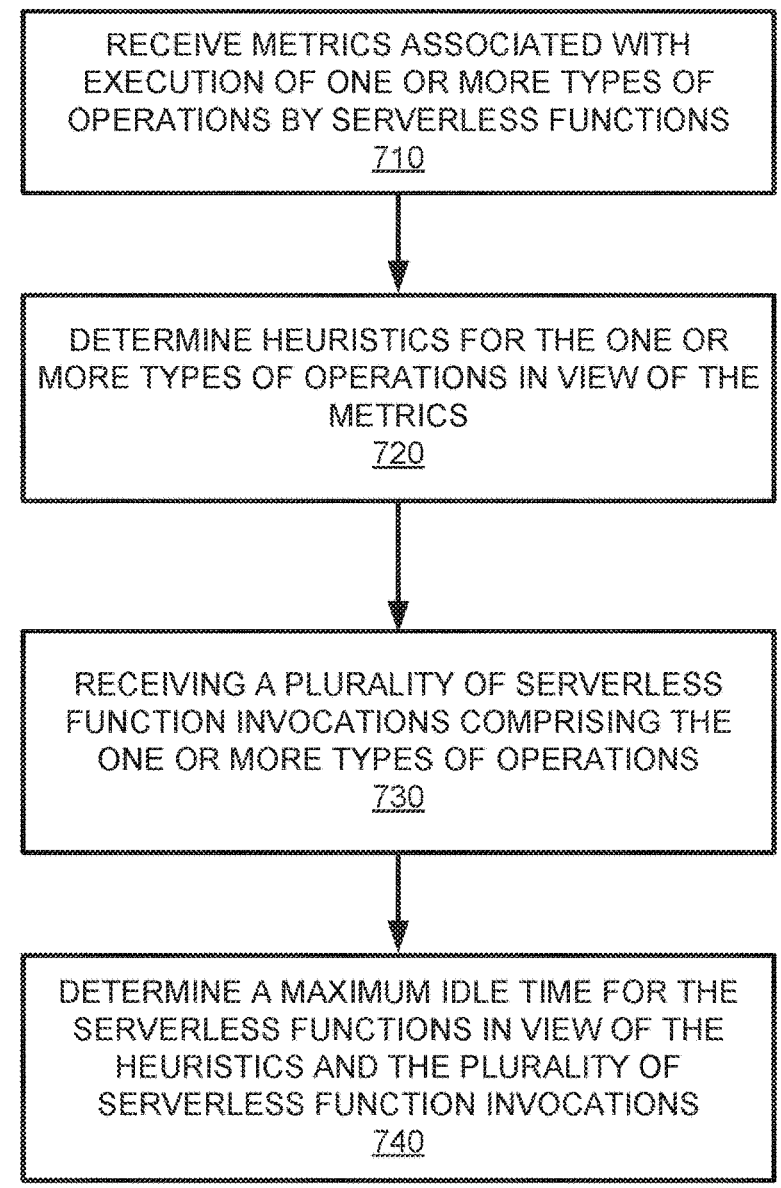
FIG. 7 is a flow diagram of a method of determining maximum idle times for serverless functions, in accordance with some embodiments.

FIG. 7 is a flow diagram of a method 700 of determining maximum idle times for serverless functions, in accordance with some embodiments. Method 700 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 700 may be performed by serverless function invoker 142 of scaling system 140 of FIG. 1.

With reference to FIG. 7, method 700 illustrates example functions used by various embodiments. Although specific function blocks ("blocks") are disclosed in method 700, such blocks are examples. That is, embodiments are well suited to performing various other blocks or variations of the blocks recited in method 700. It is appreciated that the blocks in method 700 may be performed in an order different than presented, and that not all of the blocks in method 700 may be performed.

Method 700 begins at block 710, where the processing logic receives metrics associated with execution of one or more types of operations by serverless functions. As previously described, a serverless framework may receive requests to perform various functions/operations that are executed by the serverless functions. For example, the serverless framework may receive requests from one or more client devices to perform various operations of a web application. The serverless framework may then use one or more serverless functions to perform (e.g., execute) the operations of the web application and provide the results to the requesting client devices.

At block 720, the processing logic determines heuristics for the one or more types of operations in view of the metrics. In embodiments, different types of operations may take different amounts of time to complete. For example, a first type of operation may take 150 milliseconds (ms) to be executed by a serverless framework, while another type of operation make take 50 ms. In an embodiment, the heuristics may include the time(s) to execute these different types of operations. In embodiments, the heuristics may include latencies associated with the scaling serverless functions to execute the one or more types of operations. For example, the heuristics may include cold-start latencies, the total latencies (e.g., amount of time elapsed from receiving a request to providing the result of the request), and/or idle times for the one or more types of operations.

At block 730, the processing logic receives a plurality of serverless function invocations comprising the one or more types of operations. In embodiments, requests to perform the one or more types of operations may be received by a request router of a serverless framework. Upon receiving the requests, the request router may transmit one or more serverless function invocations (e.g., trigger functions) to the processing logic. The processing logic may identify existing serverless functions that are available to execute the operations (e.g., are idle) and/or may invoke new serverless functions to execute the operations.

At block 740, the processing logic determines a maximum idle time for the serverless functions in view of the heuristics and the plurality of serverless function invocations. As described above, different types of operations may take different amounts of time to be executed by the serverless functions. In embodiments, the processing logic may determine that it is more efficient to adjust the idle times of existing serverless functions to execute the operations rather than shutting down the existing serverless functions and subsequently invoking new serverless functions to execute the operations, which may introduce cold-start latency from starting up the new serverless functions.

Upon receiving the plurality of serverless function invocations, the processing logic may identify the types of operations associated with the serverless function invocations and utilize the scaling heuristics for these types of operations to determine a maximum idle time for the serverless functions. In embodiments, the maximum idle time may be greater than the time to execute one or more of the types of operations at block 730. For example, if the time to execute a particular type of operation is 100 ms, then the maximum idle time may be 150 ms. In an embodiment, the maximum idle time may be less than the cold-start latency for invoking a new serverless function. For example, if the cold-start latency for invoking a new serverless function is 250 ms, then the maximum idle time may be 200 ms.

In embodiments, the processing logic may determine multiple maximum idle times for different sets of the serverless functions. For example, the processing logic may determine a first maximum idle time for a first set of serverless functions, and a second maximum idle time for a second set of serverless functions. In some embodiments, the maximum idle time may be dynamically adjusted as subsequent requests to perform types of operations are received. In an embodiment, the maximum idle time may be dynamically adjusted upon receiving updated metrics and/or determining new heuristics for the one or more types of operations.

Figure 8:
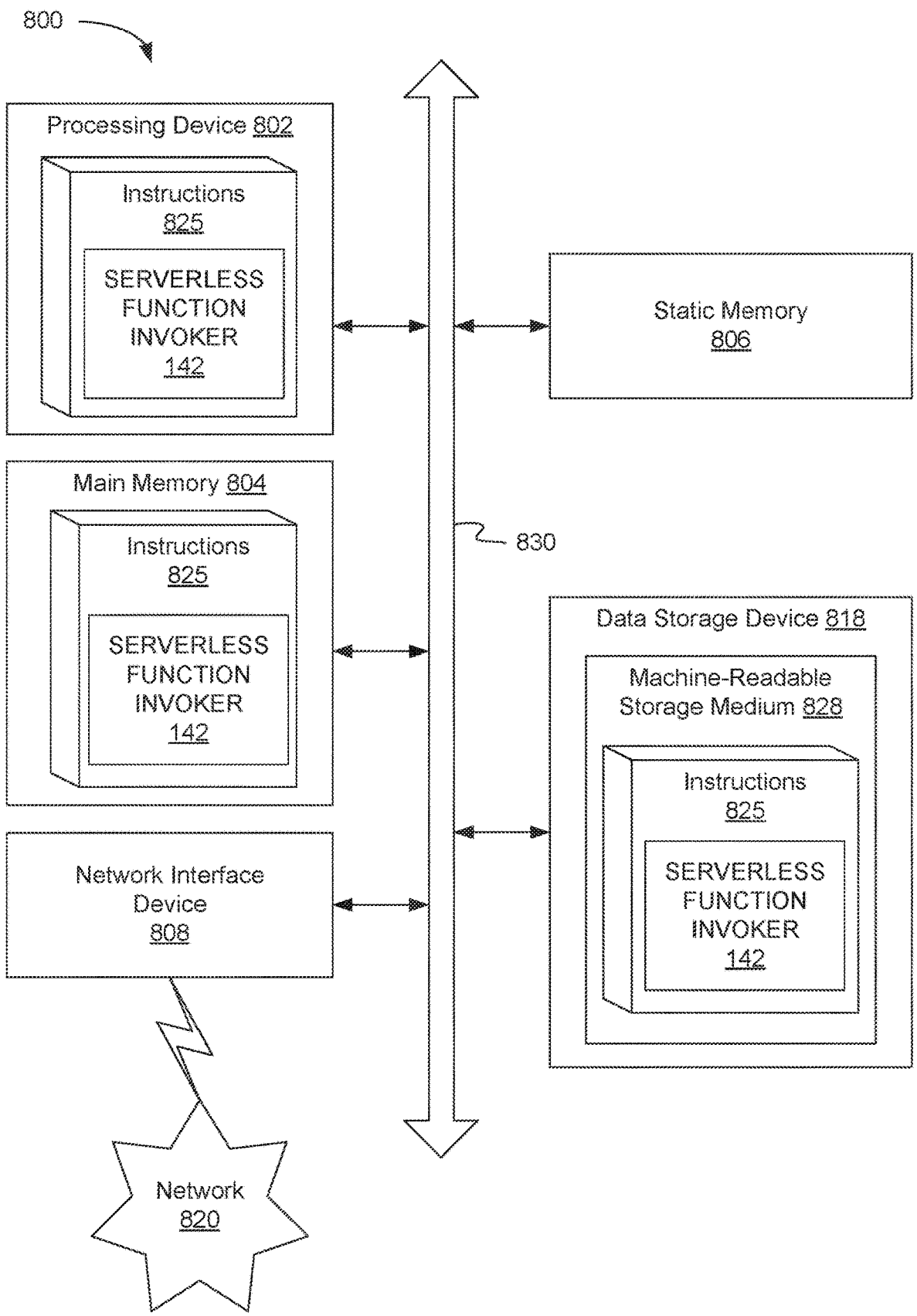
FIG. 8 is a block diagram of an example apparatus that may perform one or more of the operations described herein, in accordance with some embodiments of the present disclosure.

FIG. 8 is a block diagram of an example computing device 800 that may perform one or more of the operations described herein, in accordance with some embodiments. Computing device 800 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 800 may include a processing device (e.g., a general purpose processor, a PLD, etc.) 802, a main memory 804 (e.g., synchronous dynamic random access memory (DRAM), read-only memory (ROM)), a static memory 806 (e.g., flash memory and a data storage device 818), which may communicate with each other via a bus 830.

Processing device 802 may be provided by one or more general-purpose processing devices such as a microprocessor, central processing unit, or the like. In an illustrative example, processing device 802 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 802 may also comprise one or more special-purpose processing devices such as an application specific integrated circuit (ASIC), a field programmable gate array (FPGA), a digital signal processor (DSP), network processor, or the like. The processing device 802 may be configured to execute the operations described herein, in accordance with one or more aspects of the present disclosure, for performing the operations and steps discussed herein.

Computing device 800 may further include a network interface device 808 which may communicate with a network 820. The computing device 800 also may include a video display unit 810 (e.g., a liquid crystal display (LCD) or a cathode ray tube (CRT)), an alphanumeric input device 812 (e.g., a keyboard), a cursor control device 814 (e.g., a mouse) and an acoustic signal generation device 816 (e.g., a speaker). In one embodiment, video display unit 810, alphanumeric input device 812, and cursor control device 814 may be combined into a single component or device (e.g., an LCD touch screen).

Data storage device 818 may include a computer-readable storage medium 828 on which may be stored one or more sets of instructions 825 that may include instructions for a serverless function invoker, e.g., serverless function invoker 142 for carrying out the operations described herein, in accordance with one or more aspects of the present disclosure. Instructions 825 may also reside, completely or at least partially, within main memory 804 and/or within processing device 802 during execution thereof by computing device 800, main memory 804 and processing device 802 also constituting computer-readable media. The instructions 825 may further be transmitted or received over a network 820 via network interface device 808.

While computer-readable storage medium 828 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Example 1 is a method comprising receiving a plurality of serverless function invocations; determining a quantity of serverless function invocations of the plurality of serverless function invocations that corresponds to a particular type of serverless function invocation; and scaling, by a processing device, a number of serverless functions at a determined rate in view of the quantity of serverless function invocations corresponding to the particular type of serverless function invocation.

Example 2 is the method of Example 1, wherein scaling the number of serverless functions comprises invoking one or more containers for execution of functions associated with the plurality of serverless function invocations.

Example 3 is the method of Example 1 or Example 2, wherein scaling the number of serverless functions comprises removing one or more containers for execution of functions associated with the plurality of serverless function invocations.

Example 4 is the method of Example 1, Example 2, or Example 3, wherein scaling the number of serverless functions comprises at least one of invoking one or more containers or removing one or more containers for execution of functions associated with the plurality of serverless function invocations at the determined rate.

Example 5 is the method of Example 1, Example 2, Example 3, or Example 4, wherein the determined rate is determined in view of a quality-of-service (QoS) parameter associated with the plurality of serverless function invocations.

Example 6 is the method of Example 1, Example 2, Example 3, Example 4, or Example 5, further comprising analyzing metrics associated with the particular type of serverless function invocation, wherein the determined rate for scaling of the number of serverless functions is determined in view of the analyzed metrics.

Example 7 is the method of Example 1, Example 2, Example 3, Example 4, Example 5, or Example 6, wherein the metrics correspond to an idle time of the number of serverless functions.

Example 8 is the method of Example 1, Example 2, Example 3, Example 4, Example 5, Example 6, or Example 7, wherein the particular type of serverless function invocation corresponds to a request to perform a function using a serverless function.

Example 9 is the method of Example 1, Example 2, Example 3, Example 4, Example 5, Example 6, Example 7, or Example 8, wherein the particular type of serverless function invocation corresponds to a scaling command.

Example 10 is a system comprising a memory; and a processing device, operatively coupled to the memory, to receive one or more types of serverless function invocations; in response to receiving the one or more types of serverless function invocations, invoke one or more serverless functions; receive metrics from the one or more serverless functions; and generate scaling heuristics for scaling of a number of serverless functions in view of the received metrics.

Example 11 is the system of Example 10, wherein the metrics correspond to a latency of the one or more serverless functions.

Example 12 is the system of Example 10, or Example 11, wherein the metrics correspond to an idle time of the one or more serverless functions.

Example 13 is the system of Example 10, Example 11, or Example 12, wherein the one or more types of serverless function invocations comprises a trigger function.

Example 14 is the system of Example 10, Example 11, Example 12, or Example 13, wherein to scale the number of serverless functions in view of the scaling heuristics, the processing device is further to determine a rate to invoke the number of serverless functions in view of the scaling heuristics; and invoke the number of serverless functions at the determined rate.

Example 15 is the system of Example 10, Example 11, Example 12, Example 13, or Example 14, wherein to scale the number of serverless functions in view of the scaling heuristics, the processing device is further to determine a rate to remove the number of serverless functions in view of the scaling heuristics; and remove the number of serverless functions at the determined rate.

Example 16 is the system of Example 10, Example 11, Example 12, Example 13, Example 14, or Example 15, wherein the one or more serverless functions correspond to containers.

Example 17 is the system of Example 10, Example 11, Example 12, Example 13, Example 14, Example 15, or Example 16, wherein the one or more serverless functions correspond to virtual machines.

Example 18 is a non-transitory computer-readable storage medium including instructions that, when executed by a processing device, cause the processing device to determine corresponding quantities of one or more types of serverless function invocations; determine whether the corresponding quantities of at least one of the one or more types of serverless function invocations satisfies a threshold; in response to determining that the corresponding quantities of the at least one of the one or more types of serverless function invocations satisfies the threshold, identify a first rate to scale a number of serverless functions; and scale the number of serverless functions in view of the first rate.

Example 19 is the non-transitory computer-readable storage medium of Example 18, wherein the processing device is further to in response to determining that the corresponding quantities of the at least one of the one or more types of serverless function invocations does not satisfy the threshold, identify a second rate to scale a number of serverless functions; and scale the number of serverless functions in view of the second rate.

Example 20 is the non-transitory computer-readable storage medium of Example 18 or Example 19, wherein the first rate is greater than the second rate.

Example 21 is the non-transitory computer-readable storage medium of Example 18, Example 19, or Example 20, wherein the one or more types of serverless function invocations comprise a request to perform a function using a serverless function.

Example 22 is the non-transitory computer-readable storage medium of Example 18, Example 19, Example 20, or Example 21, wherein the one or more types of serverless function invocations comprises a scaling command.

Example 23 is the non-transitory computer-readable storage medium of Example 18, Example 19, Example 20, Example 21, or Example 22, wherein scaling the number of serverless functions comprises invoking one or more containers for execution of the serverless functions.

Example 24 is the non-transitory computer-readable storage medium of Example 18, Example 19, Example 20, Example 21, Example 22, or Example 23, wherein scaling the number of serverless functions comprises removing one or more containers for execution of the serverless functions.

Example 25 is a method comprising receiving metrics associated with execution of one or more types operations by serverless functions; determining heuristics for the one or more types of operations in view of the metrics; receiving a plurality of serverless function invocations comprising the one or more types of operations; and determining, by a processing device, a maximum idle time for the serverless functions in view of the heuristics and the plurality of serverless function invocations.

Example 26 is the method of Example 25, wherein the metrics comprise latencies associated with the execution of the one or more types of functions.

Example 27 is the method of Example 25 or Example 26, wherein determining the maximum idle time for the serverless functions comprises determining a quantity of each of the one or more types of operations associated the plurality of serverless function invocations; and determining the maximum idle time for the serverless functions in view of the quantity of each of the one or more types of operations.

Example 28 is the method of Example 25, Example 26, or Example 27, wherein the serverless functions comprise one or more virtual machines.

Example 29 is the method of Example 25, Example 26, Example 27, or Example 28, wherein the serverless functions comprise one or more containers.

Example 30 is an apparatus comprising means for receiving a plurality of serverless function invocations; means for determining a quantity of serverless function invocations of the plurality of serverless function invocations that corresponds to a particular type of serverless function invocation; and means for scaling a number of serverless functions at a determined rate in view of the quantity of serverless function invocations corresponding to the particular type of serverless function invocation.

Example 31 is the apparatus of Example 30, wherein scaling the number of serverless functions comprises means for invoking one or more containers for execution of functions associated with the plurality of serverless function invocations.

Example 32 is the apparatus of Example 30 or Example 31, wherein scaling the number of serverless functions comprises means for removing one or more containers for execution of functions associated with the plurality of serverless function invocations.

Example 33 is the apparatus of Example 30, Example 31, or Example 32, wherein scaling the number of serverless functions comprises at least one of invoking one or more containers or removing one or more containers for execution of functions associated with the plurality of serverless function invocations at the determined rate.

Example 34 is the apparatus of Example 30, Example 31, Example 32, or Example 33, wherein the determined rate is determined in view of a quality-of-service (QoS) parameter associated with the plurality of serverless function invocations.

Example 35 is the apparatus of Example 30, Example 31, Example 32, Example 33, or Example 34, further comprising means for analyzing metrics associated with the particular type of serverless function invocation, wherein the determined rate for scaling of the number of serverless functions is determined in view of the analyzed metrics.

Example 36 is the apparatus of Example 30, Example 31, Example 32, Example 33, Example 34, or Example 35, wherein the metrics correspond to an idle time of the number of serverless functions.

Example 37 is the apparatus of Example 30, Example 31, Example 32, Example 33, Example 34, or Example 35, or Example 36, wherein the particular type of serverless function invocation corresponds to a request to perform a function using a serverless function.

Example 38 is the apparatus of Example 30, Example 31, Example 32, Example 33, Example 34, or Example 35, Example 36, or Example 37, wherein the particular type of serverless function invocation corresponds to a scaling command.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A system comprising:
a memory; and
a processing device, operatively coupled to the memory, to:
receive one or more types of serverless function invocations;
in response to receiving the one or more types of serverless function invocations, invoke one or more serverless functions;
receive metrics from the one or more serverless functions;
generate scaling heuristics for scaling of a number of serverless functions in view of the received metrics; and
scale the number of serverless functions in view of the scaling heuristics, wherein, to scale the number of serverless functions in view of the scaling heuristics, the processing device is to:
determine a rate to adjust the number of serverless functions in view of the scaling heuristics; and
adjust the number of serverless functions at the determined rate.

2. The system of claim 1, wherein the metrics correspond to a latency of the one or more serverless functions.

3. The system of claim 1, wherein the metrics correspond to an idle time of the one or more serverless functions.

4. The system of claim 1, wherein the one or more types of serverless function invocations comprises a trigger function.

5. The system of claim 4, wherein, to determine the rate to adjust the number of serverless functions in view of the scaling heuristics, the processing device is further to determine the rate to invoke the number of serverless functions in view of the scaling heuristics, and
wherein to adjust the number of serverless functions at the determined rate, the processing device is to invoke the number of serverless functions at the determined rate.

6. The system of claim 4, wherein, to determine the rate to adjust the number of serverless functions in view of the scaling heuristics, the processing device is to determine the rate to remove the number of serverless functions in view of the scaling heuristics, and
wherein, to adjust the number of serverless functions at the determined rate, the processing device is to remove the number of serverless functions at the determined rate.

7. The system of claim 1, wherein the one or more serverless functions correspond to containers.

8. The system of claim 1, wherein the one or more serverless functions correspond to virtual machines.

9. A non-transitory computer-readable storage medium including instructions that, when executed by a processing device, cause the processing device to:
determine corresponding quantities of one or more types of serverless function invocations;
determine, by the processing device, whether the corresponding quantities of at least one of the one or more types of serverless function invocations satisfies a threshold;
in response to determining that the corresponding quantities of the at least one of the one or more types of serverless function invocations satisfies the threshold, identify a first rate to scale a number of serverless functions; and
scale the number of serverless functions in view of the first rate.

10. The non-transitory computer-readable storage medium of claim 9, wherein the processing device is further to:
in response to determining that the corresponding quantities of the at least one of the one or more types of serverless function invocations does not satisfy the threshold, identify a second rate to scale a number of serverless functions; and
scale the number of serverless functions in view of the second rate.

11. The non-transitory computer-readable storage medium of claim 10, wherein the first rate is greater than the second rate.

12. A method, comprising:
receiving one or more types of serverless function invocations;
in response to receiving the one or more types of serverless function invocations, invoking one or more serverless functions;
receiving metrics from the one or more serverless functions;
generating, by a processing device, scaling heuristics for scaling of a number of serverless functions in view of the received metrics; and
scaling the number of serverless functions in view of the scaling heuristics, wherein scaling the number of serverless functions in view of the scaling heuristics comprises:
determining a rate to adjust the number of serverless functions in view of the scaling heuristics; and
adjusting the number of serverless functions at the determined rate.

13. The method of claim 12, wherein the metrics correspond to a latency of the one or more serverless functions.

14. The method of claim 12, wherein the metrics correspond to an idle time of the one or more serverless functions.

15. The method of claim 12, wherein the one or more types of serverless function invocations comprises a trigger function.

16. The method of claim 15, wherein determining the rate to adjust the number of serverless functions in view of the scaling heuristics comprises determining the rate to invoke the number of serverless functions in view of the scaling heuristics, and
wherein adjusting the number of serverless functions at the determined rate comprises invoking the number of serverless functions at the determined rate.

17. The method of claim 15, wherein determining the rate to adjust the number of serverless functions in view of the scaling heuristics comprises determining the rate to remove the number of serverless functions in view of the scaling heuristics, and
wherein adjusting the number of serverless functions at the determined rate comprises removing the number of serverless functions at the determined rate.

18. The method of claim 12, wherein the one or more serverless functions correspond to containers.

19. The method of claim 12, wherein the one or more serverless functions correspond to virtual machines.

* * * * *